United States Patent [19]

Leenhouts et al.

[11] Patent Number: 4,521,079
[45] Date of Patent: Jun. 4, 1985

[54] LOW-REFLECTION LIQUID-CRYSTAL DISPLAY

[75] Inventors: Frans Leenhouts, Lenzburg, Switzerland; Hans Krüger, Munich, Fed. Rep. of Germany

[73] Assignee: Siemens Aktiengesellschaft, Berlin and Munich, Fed. Rep. of Germany

[21] Appl. No.: 416,059

[22] Filed: Sep. 8, 1982

[30] Foreign Application Priority Data

Sep. 21, 1981 [DE] Fed. Rep. of Germany ....... 3137518

[51] Int. Cl.³ .......................... G02F 1/135; G02B 5/28
[52] U.S. Cl. ................... 350/339 R; 350/166
[58] Field of Search ..................... 350/338, 339 R, 166

[56] References Cited

U.S. PATENT DOCUMENTS

| 3,736,047 | 5/1973 | Gelber et al. ............ 350/339 R X |
| 4,248,502 | 2/1981 | Bechteler et al. .......... 350/339 R X |

FOREIGN PATENT DOCUMENTS

| 2949837 | 6/1981 | Fed. Rep. of Germany . |
| 0049923 | 3/1982 | Japan ........................ 350/338 |
| 2024444 | 1/1980 | United Kingdom . |

OTHER PUBLICATIONS

Heavens, *Optical Properties of Thin Solid Films*, Butterworths Scientific Publications, London, 1955, pp. 113–116.

*Primary Examiner*—John K. Corbin
*Assistant Examiner*—David Lewis
*Attorney, Agent, or Firm*—Herbert L. Lerner; Laurence A. Greenberg

[57] ABSTRACT

A liquid crystal display enclosing between two parallel plates a liquid crystal layer which can be switched between two optically different states. The plate surfaces facing each other each carry a matching layer on top of which are the electrodes. On top of the electrode is a first layer system with a dielectric layer and a topmost orientation layer. The refraction index $n_u$ of the substrata is smaller than the index $n_e$ of the electrode. The index of the matching layer has the following relationship:

$$n_a = \sqrt{n_u \cdot n_e},$$

The matching layer has a thickness $d_a$, according to:

$$\left( \frac{2m - 1\lambda}{4n_a} - 12 \right) \text{ nm} \leq d_a \leq \left( \frac{2m - 1\lambda}{4n_a} + 12 \right),$$

wherein $\lambda = 550$ nm, m = natural integer $> 0$, and nm = nanometer,

The electrode has a thickness $d_e$, according to: $d_e \leq 30$ nm or $$\left( \frac{m\lambda}{2n_e} - 8 \right) \text{ nm} \leq d_e \leq \left( \frac{m\lambda}{2n_e} + 8 \right) \text{ nm}.$$

9 Claims, 1 Drawing Figure

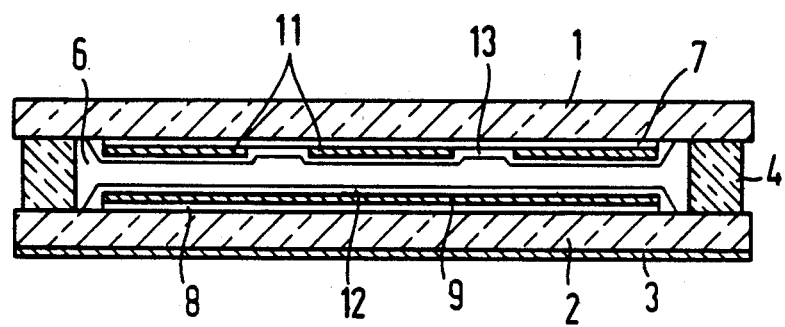

LOW-REFLECTION LIQUID-CRYSTAL DISPLAY

BACKGROUND OF THE INVENTION

1. Field of the Invention

The invention relates to a liquid crystal display with two spaced parallel support plates which enclose a liquid crystal layer that can be switched between two optically different states. The surfaces of the plates facing each other carry electrodes covered by a dielectric layer.

2. Description of the Prior Art

German Published Non-Prosecuted Application DE-OS No. 28 27 258 (U.S. Pat. No. 42 48 502) describes a liquid crystal display of this type.

The support plates of a liquid-crystal display are usually provided with a number of layers of optically different density, which reflect at their boundary surfaces part of the incident light. As a rule, these reflections are so strong that they reduce the picture contrast appreciably and make the not addressed segments stand out optically.

Work has therefore been done for years on an effective way to reduce reflections and a large number of proposals have been discussed, but a solution has not been arrived at that is acceptable from all angles. The reason for this is primarily that the display area was to be kept free of reflections in the regions that are without electrodes as well as over the electrodes, and that this demanding condition must be met in a simple manner, since cost considerations have come to play a central role.

The cited Offenlegungsschrift No. 28 27 258 describes, among other things, a type of display in which the electrodes are enclosed between a continuous double layer, consisting of a protective layer which is in direct contact with the support plate, and an orientation layer facing the liquid crystal. The conductive layer and the orientation layer must then have a thickness which depends in a characteristic manner on the wavelength of the light as well as on the index of refraction of the substrate, the electrode, the orientation layer and the liquid crystal, while the protective layer should have, as far as possible, the same optical density as the support plate. With such a coating, the reflections can be suppressed sufficiently on the entire display area without special extra effort because, first, a special layer for orienting the liquid-crystal molecules and for shielding the electrodes against the alkali ions of the substrate is necessary anyhow, and second, the thicknesses of these layers may deviate distinctly from the ideal values. On the other hand, the antireflection effect is not always sufficient if the display works with unpolarized light. This relates to the fact that the birefringent liquid crystal has, for radiation with different directions of polarization, different optical densities, but the layer thicknesses are optimized under the assumption that the liquid-crystal layer has only a single index of refraction.

Interference in the display could, of course, also be suppressed by an antireflection coating inserted between the support plate and the electrodes. In this manner, however, good values of attenuation with unpolarized radiation are obtained only if the coating is built-up from a multiplicity of carefully matched individual layers. If, in order to limit the manufacturing effort, only two individual layers are used, the not addressed segments often have a tinge of color (U.S. Pat. No. 3,736,047).

Therefore, an efficient antireflection technique is lacking, by which a liquid-crystal display can be interference-suppressed optically perfectly on the entire area if the display is also operated with unpolarized light. To close this gap which is troublesome particularly especially because it has been possible in the meantime to develop competitive liquid-crystal displays without polarizers, a display with the features according to the invention is proposed.

SUMMARY OF THE INVENTION

With the foregoing and other objects in view, there is provided in accordance with the invention a liquid-crystal display with (1) two mutually parallel, spaced-apart support plates which (2) enclose between them a liquid-crystal layer which can be switched between two optically different states, and (3) carry, on the surfaces of the two plates facing each other, electrically conductive coatings as electrodes, with at least one of the two support plates designated first support plate (4) carrying several separately addressable electrodes, and (5) a continuous dielectric layer designated matching layer under the electrodes, and (6) a first layer system disposed on top of the electrodes which system contains at least one continuous dielectric layer and a topmost layer designated orientation layer which aligns the liquid-crystal layer, the combination therewith wherein at least in the first support plate (7) the matching layer rests on a substrate, and the refraction index $n_u$ of the latter is smaller than the refraction index $n_e$ of the electrode, (8) the matching layer has an index of refraction $n_a$, which has at least approximately, the following relationship to the refraction indices of the electrode and substrate $$n_a = \sqrt{n_u \cdot n_e} ,$$

(9) the matching layer has a thickness $d_a$, according to $$\left( \frac{2m-1}{4n_a} \lambda - 12 \right) \text{ nm} \leq d_a \leq \left( \frac{2m-1}{4n_a} \lambda + 12 \right) \text{ nm}$$

($\lambda = 550$ nm, m=natural integer>0), and nm is nanometer, and

(10) the electrode has a thickness $d_e$, within the range according to $$d_e \leq 30 \text{ nm or } \left( \frac{m\lambda}{2n_e} - 8 \right) \text{ nm} \leq d_e \leq \left( \frac{m\lambda}{2n_e} + 8 \right) \text{ nm}.$$

Other features which are considered as characteristic for the invention are set forth in the appended claims.

Although the invention is illustrated and described herein as embodied in low-reflection liquid-crystal display, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which diagrammatically illustrates a liquid crystal display in cross section. The display has two sodium silicate glass plates with a refractive index of 1.48 separated by a frame to form a cavity. On the surfaces of the plates facing the interiors is a layer of $SiO_2SnO_2$ or $SiO_2TiO_2$ with a refractive index of 1.65–1.75 and a thickness of 105–125 nm. On top of one of these layers on one plate are addressable segment electrodes, and on top of the layer on the other plate is a continuous conductive layer (electrode). Electrodes on both plates are an $In_2O_3/SnO_3$ alloy with an optical density of 2.0 and a thickness of 25–30 nm. Covering the electrodes is a two layer system—a lower layer of $Al_2O_3$ with a refractive index of 1.63 and thinner than 20 nm, and on top of that a rubbed polyimide layer with an index of 1.63 and a thickness of 20–70 nm.

DETAILED DESCRIPTION OF THE INVENTION

If the liquid crystal layer exhibits a pronounced birefringence effect and/or cancellation of reflection as complete as possible is important, the plate coating provided according to the invention should be extended by one or two dielectric (multiple) layers. The additional layers or layer systems would have to be inserted between the support plate and the electrode or the first layer system and/or between the electrode or the matching layer and the liquid crystal, and preferably also take on the function of a protective or insulating layer for the electrodes.

In the proposed display type, the conductive layer need not be very thin ($\leq 30$ nm) in every case or a multiple of one-half the wavelength. If the electrode is placed between a matching layer with an index of refraction $n_a$ between 1.65 and 1.70 and a layer system with an index of refraction $n_{s1}$ between 1.60 and 1.70 and a thickness between 20 nm and 70 nm, then its thickness can be varied at will within wide limits. This circumstance is particularly valuable since thin electrodes frequently have too low a conductivity and $\lambda/2$-electrodes require narrow tolerances and, in addition, often exhibit a disturbing color tinge.

The drawing shows in a schematized lateral cross section a seven-segment numerical display of the liquid crystal type. The cell proper contains a front support plate (front plate) 1, a rear support plate (rear plate) 2 and a reflector 3 arranged behind the rear plate. The two substrates 1 and 2 are connected together at a predetermined distance by a frame 4. The space defined by the frame and the two plates is filled with a liquid-crystal layer 6. The two substrates 1 and 2 are provided on their surfaces facing each other with a matching layer each designated respectively 7 and 8, an electrically conductive layer (continuous rear electrode 9 on the rear plate 2, and several addressable segment electrodes 11 on the front plate 1), and with an orientation layer designated respectively 12 and 13. The liquid-crystal layer consists of a nematic carrier with a chiral additive; in the "off" condition, it is oriented planar-cholesterically and assumes a quasi homeotropic nematic texture if a sufficiently high voltage is applied. The details of this so-called "phase-change" effect are described in U.S. Pat. No. 3,837,730.

The parts of the display are as follows: The two substrates 1 and 2 consist of a sodium silicate glass with an index of refraction of 1.48. The matching layers 7 and 8 consist of $SiO_2SnO_2$ or $SiO_2TiO_2$ with an index of refraction between 1.65 and 1.75 as well as a thickness between 105 nm and 125 nm. For the conductive layers, an $In_2O_3/SnO_2$ alloy with an optical density of 2.0 and a thickness of between 25 nm and 30 nm is chosen. The first layer system has two layers: an $Al_2O_3$ layer which has an index of refraction of 1.63 and is thinner than 20 nm, is disposed under a rubbed polyimide layer with an index of refraction of 1.63 and a thickness between 20 nm and 50 nm (nanometer).

Calculations and tests have shown that particularly good results are obtained if the first layer system consists of materials, the refraction indices of which are between 1.60 and 1.70 and have a total thickness of between 20 nm and 70 nm. If a further layer system is provided between the first layer system and the electrode or the matching layer, respectively, it should have a total thickness which is either between 20 nm and 50 nm or between $(m300-20)$ nm and $(m300+20)$ nm ($m$=natural integer$>0$) and the individual layers of which have refraction indices between 1.40 and 1.50.

If the total reflections at every point of the display area is not only to be approximately equal but also have extremely small values of less than 1%, the dielectric layers and the substrate should be matched to each other in such a manner that the reflection coefficient at a given boundary surface, namely, at the inside of the plate outside the electrodes, is smaller than 1%.

The invention is not limited to the embodiment example shown. Thus, within the limits given, completely different refraction index thickness combinations can be formed; the individual parameters can be varied here relatively independently of each other. In addition, an expert is at liberty to integrate further layers into the layer formation proposed here. For instance, a conductive layer could further be inserted over the electrodes between the first and third layer system; such a two-level configuration enhances the possible presentations. Also it is not necessary to coat both support plates in the same manner.

There are claimed:

1. A liquid-crystal display with
   (1) two mutually parallel, spaced-apart support plates which
   (2) enclose between them a liquid-crystal layer which can be switched between two optically different states, and
   (3) carry, on the surfaces of the two plates facing each other, electrically conductive coatings as electrodes, with at least one of the two support plates designated to be a first support plate
   (4) carrying several separately addressable electrodes, and
   (5) a continuous dielectric layer designated to be a matching layer under the electrodes, and
   (6) a first layer system disposed on top of the electrodes which system contains at least one continuous dielectric layer and a topmost layer designated to be an orientation layer which aligns the liquid-crystal layer, the combination therewith wherein at least in the first support plate (7) the matching layer rests on a substrate, and the refraction index $n_u$ of the latter is smaller than the refraction index $n_e$ of the electrode, (8) the matching layer has an index of refraction $n_a$, which has at least approximately, the following relationship to the refraction indices of the electrode and substrate:

$$n_a = \sqrt{n_u \cdot n_e},$$

and wherein $n_a$ is between 1.65 and 1.75, (9) the matching layer has a thickness $d_a$, according to $$\left(\frac{2m-1\lambda}{4n_a} - 12\right) \text{ nm} \leq d_a \leq \left(\frac{2m-1\lambda}{4n_a} + 12\right)$$

($\lambda = 550$ nm, m = natural integer > 0), and nm is nanometer,

(10) the layers of the first layer system have indices of refraction between 1.60 and 1.70 and a total thickness between 20 nm and 70 nm

(11) the first layer system rests on another layer system which consists of a single continuous dielectric layer, and

(12) the protective layer of said another layer system has a refraction index between 1.40 and 1.50 and a total thickness which is in the range between 20 nm and 50 nm.

2. A liquid-crystal display according to claim 1, wherein the layers of the first layer system have indices of refraction and the thicknesses have ranges of $1.45 \leq n_u \leq 1.50$; $1.65 \leq n_a \leq 1.75$; 100 nm $\leq d_a \leq$ 125 nm; $1.95 \leq n_e \leq 2.05$ and 20 nm $\leq d_e \leq$ 30 nm, and wherein the first layer system contains, in addition to he orientation layer, at most one further layer; the orientation layer having a thickness of 25 nm to 45 nm thick; and, the additional layer having a thickness < 45 nm.

3. A liquid-crystal display according to claim 1, wherein the support plate consists of glass, the matching layer of $SiO_2SnO_2$, the electrode of $In_2O_3SnO_2$ and the orientation layer of a polyimide layer rubbed at its surface.

4. A liquid-crystal display according to claim 3, wherein the first layer system rests on another layer system which consists of a single $SiO_2$ layer.

5. A liquid-crystal display according to claim 1, wherein another electrically conductive layer is disposed in the electrode region between the first layer system and the another layer system.

6. A liquid-crystal display according to claim 1 or claim 4, wherein the support plate and its dielectric layers are chosen so that the reflection factor at the boundary surface between the support plate and its layers outside the segment electrodes is less than 1%.

7. A liquid-crystal display according to claim 1, wherein the electrode has a thickness $d_e$ in which $d_e \leq 30$ nm.

8. A liquid-crystal display according to claim 1, wherein the electrode has a thickness $d_e$ within the range according to $$\left(\frac{m\lambda}{2n_e} - 8\right) \text{ nm} \leq d_e \leq \left(\frac{m\lambda}{2n_e} + 8\right) \text{ nm}.$$

9. A liquid-crystal display with
(1) two mutually parallel, spaced-apart support plates which
(2) enclose between them a liquid-crystal layer which can be switched between two optically different states, and
(3) carry, on the surfaces of the two plates facing each other, electrically conductive coatings as electrodes, with at least one of the two support plates designated to be a first support plate
(4) carrying several separately addressable electrodes, and
(5) a continuous dielectric layer designated to be a matching layer under the electrodes, and
(6) a first layer system disposed on top of the electrodes which system contains at least one continuous dielectric layer and a topmost layer designated to be an orientation layer which aligns the liquid-crystal layer, the combination therewith wherein at least in the first support plate
(7) the matching layer rests on a substrate, and the refraction index $n_u$ of the latter is smaller than the refraction index $n_e$ of the electrode,
(8) the matching layer has an index of refraction $n_a$, which has at least approximately, the following relationship to the refraction indices of the electrode and substrate:

$$n_a = \sqrt{n_u \cdot n_e},$$

and wherein $n_a$ is between 1.65 and 1.75,
(9) the matching layer has a thickness $d_a$, according to $$\left(\frac{2m-1\lambda}{4n_a} - 12\right) \text{ nm} \leq d_a \leq \left(\frac{2m-1\lambda}{4n_a} + 12\right)$$

($\lambda = 550$ nm, m = natural integer > 0), and nm is nanometer,
(10) the layers of the first layer system have indices of refraction between 1.60 and 1.70 and a total thickness between 20 nm and 70 nm
(11) the first layer system rests on another layer system which consists of a single continuous dielectric layer, and
(12) the protective layer of said another layer system has a refraction index between 1.40 and 1.50 and a total thickness which is in the range between (m300−20)nm and (m300+20)nm.

* * * * *